US010162692B2

(12) United States Patent
Bouta et al.

(10) Patent No.: US 10,162,692 B2
(45) Date of Patent: Dec. 25, 2018

(54) RAINBOW EVENT DROP DETECTION SYSTEM (71) Applicant: Yahoo! Inc., Sunnyvale, CA (US)

(72) Inventors: Brian Bouta, West Sacramento, CA (US); Frank Teoh, Milpitas, CA (US); Shivakumar Ningappa, Milpitas, CA (US)

(73) Assignee: Excalibur IP, LLC, New York, NY (US)

(*) Notice: Subject to any disclaimer, the term of this patent is extended or adjusted under 35 U.S.C. 154(b) by 619 days.

(21) Appl. No.: 14/444,821

(22) Filed: Jul. 28, 2014

(65) Prior Publication Data
US 2016/0026520 A1 Jan. 28, 2016

(51) Int. Cl.
G06F 11/07 (2006.01)
G06F 11/30 (2006.01)

(52) U.S. Cl.
CPC ........ *G06F 11/0709* (2013.01); *G06F 11/076* (2013.01); *G06F 11/30* (2013.01)

(58) Field of Classification Search
CPC .... G06F 11/0709; G06F 11/076; G06F 11/30; H04L 43/00; H04L 12/2602; H04L 12/2642; H04L 12/2692; H04L 12/2818; H04L 41/0253; H04L 43/08; H04L 43/0876; H04L 43/10; H04L 47/10; H04L 47/11; H04L 47/20; H04L 67/025; H04L 67/22; H04L 67/42
See application file for complete search history.

(56) References Cited

U.S. PATENT DOCUMENTS

| | | | | | |
|---|---|---|---|---|---|
| 2002/0035628 | A1* | 3/2002 | Gil | .................. | H04L 12/2602 709/224 |
| 2003/0055883 | A1* | 3/2003 | Wiles, Jr. | ............ | G06F 11/3414 709/203 |
| 2006/0004594 | A1* | 1/2006 | Doliov | .............. | G06F 17/30867 705/1.1 |
| 2006/0045016 | A1* | 3/2006 | Dawdy | .................. | H04L 47/10 370/235 |
| 2006/0072451 | A1* | 4/2006 | Ross | ...................... | H04L 47/10 370/229 |
| 2008/0189409 | A1* | 8/2008 | Pitkow | ................ | H04L 12/2602 709/224 |

(Continued)

OTHER PUBLICATIONS

Puttagunta, Vasundhara et al., "Adaptive Methods for Activity Monitoring of Streaming Data," University of Maryland Baltimore County, 2002.

*Primary Examiner* — Wing F Chan
*Assistant Examiner* — Billy H Ng
(74) *Attorney, Agent, or Firm* — Weaver Austin Villeneuve & Sampson LLP (57) ABSTRACT In one embodiment, data received from one or more streaming data sources may be monitored by one or more devices. A rate of change in flow of the data received from the one or more streaming data sources may be ascertained. It may be determined whether the rate of change in flow of the data received from the one or more streaming data sources exceeds a threshold rate. Transmission of an alert may be initiated according to a result of determining whether the rate of change in the flow of the data received from the one or more streaming data sources exceeds the threshold rate.

21 Claims, 6 Drawing Sheets (56) References Cited

U.S. PATENT DOCUMENTS

| | | | |
|---|---|---|---|
| 2012/0317272 A1* | 12/2012 | Funk | H04L 67/025 709/224 |
| 2014/0173415 A1* | 6/2014 | Kattil Cherian | G06F 17/30861 715/234 |
| 2014/0300912 A1* | 10/2014 | Hohensee | G06K 15/4095 358/1.13 |
| 2015/0180947 A1* | 6/2015 | Endo | H04L 67/10 709/203 |
| 2015/0332195 A1* | 11/2015 | Jue | G06Q 10/06316 705/7.26 |

* cited by examiner

RAINBOW EVENT DROP DETECTION SYSTEM

BACKGROUND

The disclosed embodiments relate generally to methods and apparatus for monitoring data transmitted by streaming data sources, detecting data anomalies in the data, and transmitting notifications of such anomalies.

The amount of streaming data being generated is expanding exponentially from the growing variety of interconnected machines, devices, sensors, and consumer content. Moreover, the amount of data generated from any single source can be staggering.

Often, organizations implementing streaming data sources process the data transmitted by the streaming data sources via downstream processes that receive the data. Furthermore, data transmitted by a streaming data source may be obtained by multiple downstream processes. Some of these downstream processes may include batch processes. Since the input data for these batch processes is processed in batches or sets of records, the accuracy of the data processed by the batch processes is paramount.

SUMMARY

The disclosed embodiments enable data flowing from streaming data sources to be monitored. Alerts may be transmitted upon the detection of anomalies in the data flow from the streaming data sources.

In accordance with one embodiment, data received from one or more streaming data sources may be parsed to ascertain an event count for each of one or more event types over a period of time. It may be ascertained whether to transmit an alert based, at least in part, upon the event count for each of the one or more event types over the period of time. Transmission of an alert may be initiated according to a result of ascertaining whether to transmit an alert based, at least in part, upon the event count for each of the one or more event types over the period of time.

In accordance with another embodiment, data received from one or more streaming data sources may be monitored by one or more devices. A rate of change in flow of the data received from the one or more streaming data sources may be ascertained. It may be determined whether the rate of change in flow of the data received from the one or more streaming data sources exceeds a threshold rate. Transmission of an alert may be initiated according to a result of determining whether the rate of change in the flow of the data received from the one or more streaming data sources exceeds the threshold rate.

Various embodiments may be implemented via a device comprising a processor and a memory. The processor and memory are configured to perform one or more of the above described method operations. Other embodiments may be implemented via a computer readable storage medium having computer program instructions stored thereon that are arranged to perform one or more of the above described method operations.

These and other features and advantages of the disclosed embodiments will be presented in more detail in the following specification and the accompanying figures which illustrate by way of example the principles of the disclosed embodiments.

DETAILED DESCRIPTION OF THE SPECIFIC EMBODIMENTS

Reference will now be made in detail to specific embodiments of the disclosure. Examples of these embodiments are illustrated in the accompanying drawings. While the disclosure will be described in conjunction with these specific embodiments, it will be understood that it is not intended to limit the disclosure to these embodiments. On the contrary, it is intended to cover alternatives, modifications, and equivalents as may be included within the spirit and scope of the disclosure as defined by the appended claims. In the following description, numerous specific details are set forth in order to provide a thorough understanding of the disclosure. The disclosed embodiments may be practiced without some or all of these specific details. In other instances, well known process operations have not been described in detail in order not to unnecessarily obscure the disclosure. The Detailed Description is not intended as an extensive or detailed discussion of known concepts, and as such, details that are known generally to those of ordinary skill in the relevant art may have been omitted or may be handled in summary fashion.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

When a data issue originates in a streaming data source, it often goes undetected for a lengthy period of time. Moreover, data received from a streaming data source is often processed by multiple receiving processes or products. As a result, an anomaly in the data or rate at which the data is received can have a profound and disastrous impact on an organization that is unaware of the anomalies. By the time the data issue is detected, many data batches may have been processed. Where data anomalies exist, the data is generally reprocessed. Unfortunately, reprocessing of the data can take many hours or days of computing and/or human resources. The costs associated with redirecting resources for reprocessing data can be significant. Furthermore, compromised data integrity can damage the reputation of the group or company. Moreover, if data anomalies are not detected for a time greater than the retention of the input data, then reprocessing of data older than the retention time is impossible and the integrity of the processed data for those batches is compromised.

To reduce or eliminate the need to reprocess data originating from a streaming data source, it is desirable to detect data anomalies as soon as possible. More particularly, such data anomalies may be detected prior to processing the data. Unfortunately, existing systems do not support the alerting of rates of change for short time intervals (e.g., seconds or minutes).

The disclosed embodiments enable anomalies in data transmitted by streaming data sources to be detected and appropriate entities to be notified of such anomalies. Through such notification, it is possible to discontinue the processing of the data until such anomalies are non-existent.

The disclosed embodiments may be implemented in a variety of systems. An example system in which various embodiments may be implemented is described in further detail below with reference to FIG. 1.

Example System

Figure 1:
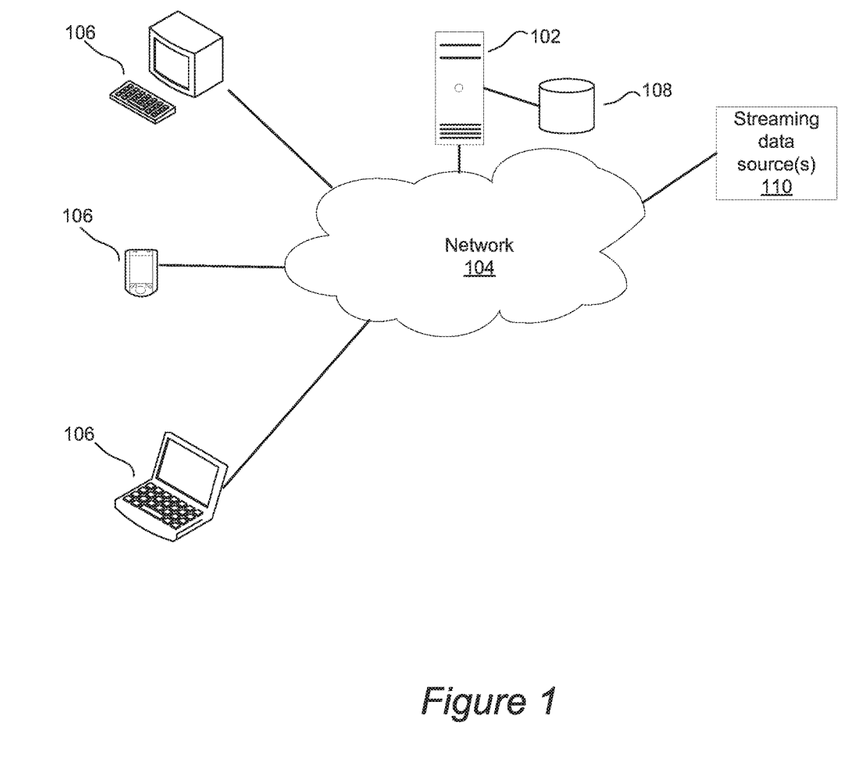
FIG. 1 is a diagram illustrating an example system in which various embodiments may be implemented.

FIG. 1 is a diagram illustrating an example system in which various embodiments may be implemented. As shown in FIG. 1, the system may include one or more servers 102 within a network. In accordance with various embodiments, the servers 102 may be associated with a web site such as a social networking web site. Examples of social networking web sites include Yahoo, Facebook, Tumblr, LinkedIn, Flickr, and Meme. The server(s) 102 may enable the web site to provide a variety of services to its users via various client devices 106. More particularly, users of the web site may perform activities such as access user accounts or public user profiles, interact with other members of the web site, transmit messages, upload files (e.g., photographs, videos), purchase goods or services, access information or content posted on the web site, etc.

The server(s) 102 may receive data from one or more streaming data sources 110 via the Internet 104. The data may be accessed by one or more of the client devices 106. Alternatively, the data may be processed by one or more other downstream processes or products. For example, the data received from the streaming data sources 110 may be processed by one or more batch processes.

In accordance with various embodiments, a monitoring system may intercept the data. Upon detection of anomalies in the data, a notification of such anomalies may be transmitted to one or more entities. For example, the entities may be entities associated with or responsible for a downstream process or product that receives or otherwise obtains the data transmitted by the streaming data sources 110. An example monitoring system will be described in further detail below with reference to FIG. 2.

Since the data received from the streaming data sources 110 by the monitoring system may not be retained, the real-time detection of anomalies in the data can be a challenge. As will be described in further detail below, to detect anomalies in the data, an event count of events for one or more event type(s) (e.g., page views or clicks) in the flow of data received from the streaming data sources 110 may be determined. For example, a change in event counts for event type(s) in the data over a short period of time may be a symptom of an issue with the data coming from one of the streaming data sources 110.

Upon detection of anomalies in the data received from one of the streaming data sources 110, it may be desirable to shut down or suspend downstream systems processing the data. This may be accomplished by transmitting a notification of such anomalies.

In accordance with various embodiments, a notification may be transmitted if the rate of change in the flow of data received from the streaming data sources 110 exceeds a particular threshold rate. More particularly, the rate of change in the event count for an event type detected in the data received from the streaming data sources may be determined, and a notification may be transmitted if the rate of change in the event count exceeds a particular threshold rate. In other embodiments, a notification may be transmitted if an event count indicating a number of events detected for a particular event type in the data received from the streaming data sources 110 over a period of time is less than a minimum threshold count or greater than a maximum threshold count.

A shut down or suspension of the downstream systems may be performed manually or automatically in response to a notification of data anomalies in data transmitted by streaming data sources. In this manner, tasks such as reprocessing of the streamed data may be reduced or eliminated. Furthermore, the risk of data loss or data corruption in such scenarios is mitigated.

It is important to note that the examples described herein are merely illustrative. Thus, it is also possible to monitor other or additional statistics for purposes of providing notifications.

In accordance with various embodiments, the server(s) 102 may provide a graphical user interface enabling a user to configure notifications that may be transmitted in accordance with various embodiments. More particularly, the circumstances under which an automated notification is to be transmitted may be indicated or specified by the user. In addition, the entities (e.g., individuals or groups of individuals) that are to receive automated notifications under various circumstances or in association with various downstream products or processes may also be configurable. For example, the user may wish one or more entities to be notified if a rate of change in the flow of data that is received from the streaming data sources 110 exceeds a particular threshold.

The server(s) 102 may have access to one or more data stores 108 that are coupled to the server(s) 102. Each of the data stores 108 may include one or more memories. The data stores 108 may store account information (e.g., data) for a plurality of user accounts. In addition, the data stores 108 may store data received from the streaming data sources 110, notification configurations, which may identify the entities to be notified, event type(s), and/or thresholds for which notifications are to be transmitted. In addition, the server(s) 102 may store information to the data stores 108 such as metrics or analysis thereof, notification policies, and/or other information supporting the automated notification of anomalies in the streaming data received from the streaming data sources 110. Example metrics include, but are not limited to, a rate of flow of data received from the streaming data sources 110, a rate of change in the flow of data received from the streaming data sources 110, an event count detected in the data received from the streaming data sources 110, and/or a rate of change in the event count detected in the data received from the streaming data sources 110.

The server(s) 102 may have access to additional user information, which may be retained in one or more user logs stored in the data stores 108. This user information or a portion thereof may be referred to as a user profile. More particularly, the user profile may include public information that is available in a public profile and/or private information. Furthermore, the user profile may include information that has been submitted by the user and/or information that has been deduced or automatically collected by the system (e.g., based upon user action(s)). For example, the user profile may include contact information of the user via which the user can be notified. Such contact information may include, but is not limited to, electronic mail address(es) and/or phone number(s).

In accordance with various embodiments, the user profile may indicate preferences of the user with respect to the automated notifications. For example, the preferences of the user may indicate whether the user wishes to receive an electronic mail message, voice message, and/or text message.

EXAMPLE EMBODIMENTS

Figure 2:
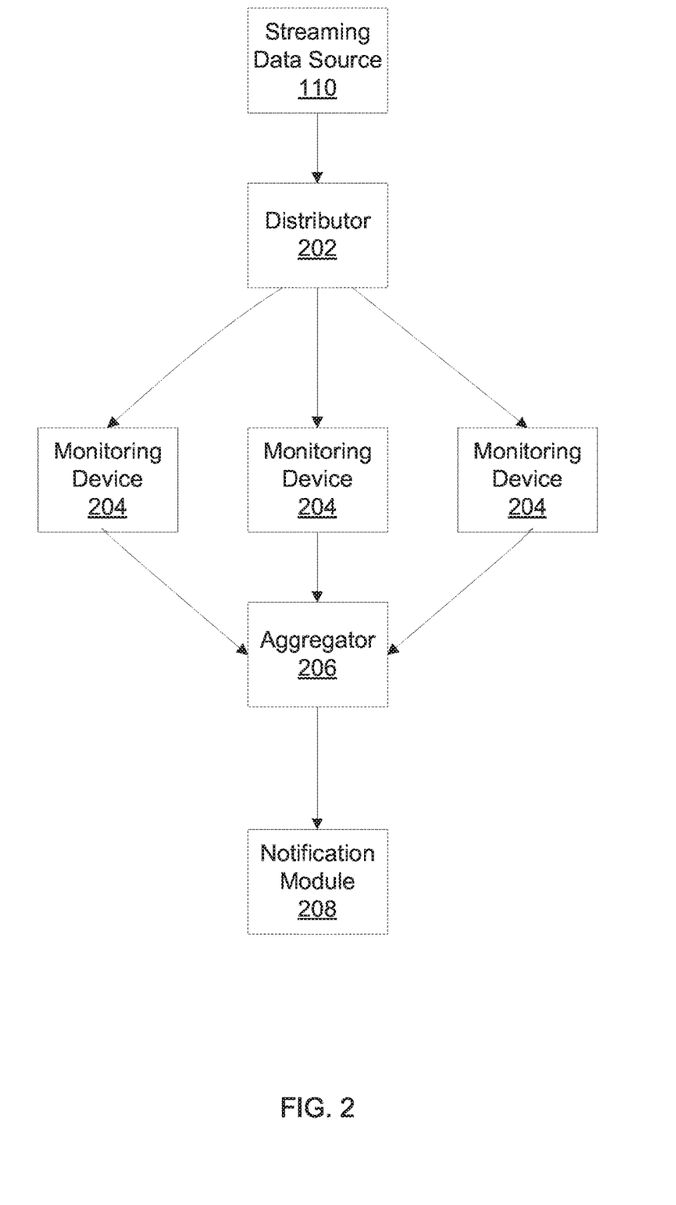
FIG. 2 is a block diagram illustrating an example system in which various embodiments may be implemented.

FIG. 2 is a block diagram illustrating an example system in which various embodiments may be implemented. As shown in FIG. 2, a Distributor 202 may intercept or otherwise receive data from one or more Streaming Data Source(s) 110. In one embodiment, the data may be transported via a User Fiber Framework (UFF). The Distributor 202 may be positioned to intercept data being transmitted to one or more destination devices. While the Distributor 202 may intercept or receive data from multiple streaming data sources, a single streaming data sources is illustrated in this example to simplify the illustration.

The Distributor 202 may distribute the data to one or more Monitoring Devices 204. In one embodiment, the Distributor 202 may include a Domain Name System (DNS) server that performs load balancing to distribute the data among the Monitoring Devices 204.

Each of the Monitoring Devices 204 may be configured to monitor data received from one or more of the Streaming Data Sources 202. In accordance with various embodiments, each of the Monitoring Devices 204 may be configured to receive the data transmitted from at least one of the Streaming Data Sources 110 and parse the data. More particularly, each of the Monitoring Devices 204 may be configured to receive the data over a period of time and parse the data to interpret incoming data events such that an event count for event type(s) for that period of time is ascertained. For example, event types may include page views and/or clicks. Thus, the event count may indicate a number of page views that have been detected over the period of time or a number of clicks that have been detected over the period of time. The event type(s) for which an event count is determined and/or frequency with which the event count is determined may be configurable. Such a configuration may be performed, for example, via a graphical user interface or a configuration file.

In accordance with various embodiments, each of the Monitoring Devices 204 may include a server. For example, each server may be a UFF server. The data may be received by the Monitoring Devices 204 via one or more of the ports of each of the Monitoring Devices 204. Such ports may be configurable according to various criteria such as time frequency and/or event types.

The Monitoring Devices 204 may intercept the data without storing the data. Alternatively, the Monitoring Devices 204 may archive data received over a period of time or a particular number of data points, enabling reprocessing to be performed for the data, as appropriate.

An Aggregator 206 may be communicatively coupled to the Monitoring Devices 204 and configured to aggregate information received or otherwise obtained from the Monitoring Devices 204. More particularly, the Aggregator 206 may ascertain a rate of change in flow of the data received by the Monitoring Devices 204 from the Streaming Data Sources 110. The Aggregator 206 may ascertain a rate of change in the flow of data across all of the Monitoring Devices 204 collectively. The Aggregator 206 may determine whether the rate of change in the flow of the data across all of Monitoring Devices 204 collectively exceeds a threshold rate and, if so, initiate transmission of an alert according to a result of determining that the rate of change in the flow of the data exceeds the threshold rate.

In accordance with various embodiments, the Aggregator 206 may be configured to periodically obtain, from the Monitoring Devices 204, information including statistics pertaining to the data received by the Monitoring Devices 204 from the Streaming Data Sources 110. Such statistics may indicate a rate of change in the flow of data received from the Streaming Data Sources 110. More particularly, such statistics may include or otherwise indicate an event count for one or more event types in the flow of data received from the Streaming Data Sources 110 by the Monitoring Devices 204 over a period of time. Such an event count may pertain to an event type such as a click or page view. From these statistics, the Aggregator 206 may aggregate the event count for a given event type across all of the Monitoring Devices 204 over a period of time. The Aggregator 206 may determine whether the event count for a given event type exceeds a maximum threshold or, alternatively, is less than a minimum threshold, and initiate transmission of an alert accordingly. In addition, the Aggregator may ascertain a rate of change in the event count of a given event type across all of the Monitoring Devices 204 collectively. The Aggregator 206 may determine whether the rate of change in the event count for the event type exceeds a threshold rate and, if so, initiate transmission of an alert if the rate of change in the event type exceeds the threshold rate.

In one embodiment, the Aggregator 206 may be implemented by one of the Monitoring Devices 204. In other embodiments, the Aggregator 206 may be implemented via a device that is physically separate from the Monitoring Devices 204.

The Aggregator 206 may receive information including the statistics from the one or more ports of each of the Monitoring Devices 204 via one or more ports of the Aggregator 206. The ports of the Aggregator 206 may be configurable according to various criteria such as time frequency and/or event types.

Transmission of alerts may be accomplished via a Notification Module 208, which may be implemented separately from the Aggregator 206 or in combination with the Aggregator 206. More particularly, the Notification Module 208 may transmit an alert to one or more entities associated with processes or products that receive data transmitted by the Streaming Data Sources 110. For example, such processes or products may process the data via a batch process. Such an alert may be transmitted in response to a communication from the Aggregator 206.

The Notification Module 208 may be configurable to transmit alerts according to various parameters. For example, an API of the Notification Module 208 may be configured to transmit alerts that pertain to a specified event type. For example, the specified event type may indicate that the events are page views. In addition, the API may be further configured to receive a specified threshold to indicate that the threshold has been exceeded. Furthermore, the API may be configured to receive an identity of an entity or group of entities to be notified.

Figure 3A:
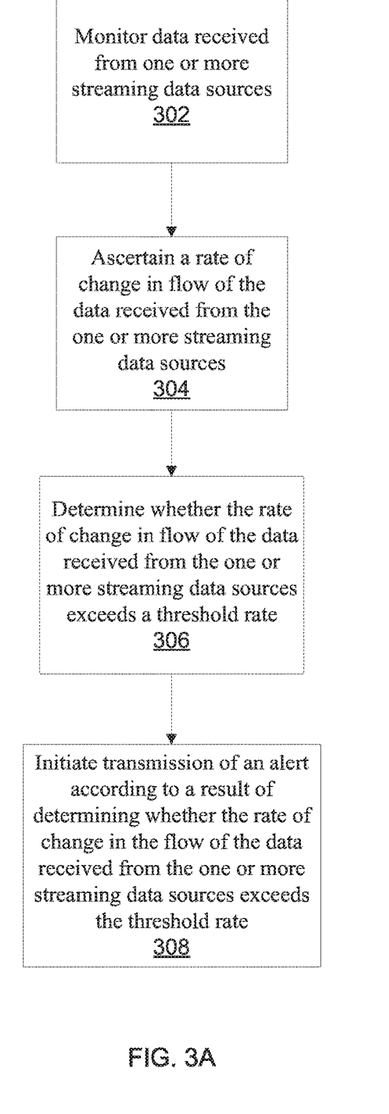
FIG. 3A is a process flow diagram illustrating an example method of performing monitoring of streaming data sources in accordance with various embodiments.

FIG. 3A is a process flow diagram illustrating an example method of performing monitoring of streaming data sources in accordance with various embodiments. One or more devices may monitor data received from one or more streaming data sources at 302. For example, the devices may include multiple Monitoring Devices, as described above with reference to FIG. 2. More particularly, the devices may receive the data from the one or more streaming data sources over a period of time and parse the data received from the one or more streaming data sources over the period of time to interpret incoming data events, enabling an event count for one or more event types to be ascertained.

An event count for a particular event type may be ascertained by parsing the data to identify a count of a particular (key, value) pair, where the key identifies an event type of the event. In this manner, an event count may be ascertained for one or more particular (key, value) pairs. Example event types include, but are not limited to, clicks and page views. Thus, the event count may indicate a number of page views that have been detected over a period of time and/or a number of clicks that have been detected over the period of time.

A rate of change in flow of the data received from the one or more streaming data sources may be ascertained at 304. More particularly, an event count indicating the number of events associated with each of one or more event types as detected in data received from the one or more streaming data sources may be obtained (e.g., received or retrieved) periodically over a period of time. For example, an Aggregator may receive or retrieve an event count associated with one or more event types from Monitoring Device(s) that have parsed the data.

In accordance with various embodiments, a rate of change in the event count for the event type(s) may be ascertained. More particularly, an Aggregator may ascertain a rate of change in the event count for the event type(s) over a period of time. For example, where a number of page views detected during a first minute is 1000 and a number of page views detected during a second minute is 1100, the rate of change in the event count may be 100 per minute.

The rate of change in an event count (e.g., number of views) may be represented as follows:

$$((events(t+del\_t) - events(t))/del\_t$$

where events may signify a number of a particular event type (e.g., page views) detected across all of the Monitoring Devices, events(t) represents a number of events (e.g., page views) of the particular event type detected across all of the Monitoring Devices over a first time period from (t−del_t) to t, where the first time period is equivalent to del_t. For example, events(t) may represent a minimum number of events of the particular event type detected at time t. Events (t+del_t) may represent the number of events of the particular event type detected across all of the Monitoring Devices over a subsequent, consecutive time period equivalent to del_t. In this example, del_t may represent a time period of a minute. However, this example is merely illustrative, and therefore other time periods (e.g., seconds, milliseconds, or hours) are possible.

It may be determined whether the rate of change in flow of the data received from the one or more streaming data sources exceeds a threshold rate at 306. More particularly, each event type may have an associated maximum threshold rate above which the rate of change in flow of the data is not to be exceeded. For example, a maximum threshold may be 1000 views per minute. Alternatively, the maximum threshold may be agnostic to the specific event type for which the rate of change is determined. For example, the maximum threshold rate may be 1000 events per minute.

In addition, it may also be determined whether the number of events for a particular event type detected over a period of time exceeds a corresponding maximum threshold. Similarly, it may be determined whether the number of events for a particular event type detected over the period of time is less than a corresponding minimum threshold.

Transmission of an alert may be initiated at 308 according to a result of the determination. More particularly, transmission of an alert may be initiated upon determining whether the rate of change in the flow of the data received from the one or more streaming data sources exceeds a corresponding threshold rate. For example, the transmission of an alert may be initiated upon determining that the rate of change in the number of events for a particular event type exceeds a corresponding threshold rate. Furthermore, the transmission of an alert may be initiated upon determining whether the total number of events detected in the flow of the data received from the one or more streaming data sources over a period of time exceeds a corresponding maximum threshold or is less than a corresponding minimum threshold.

Figure 3B:
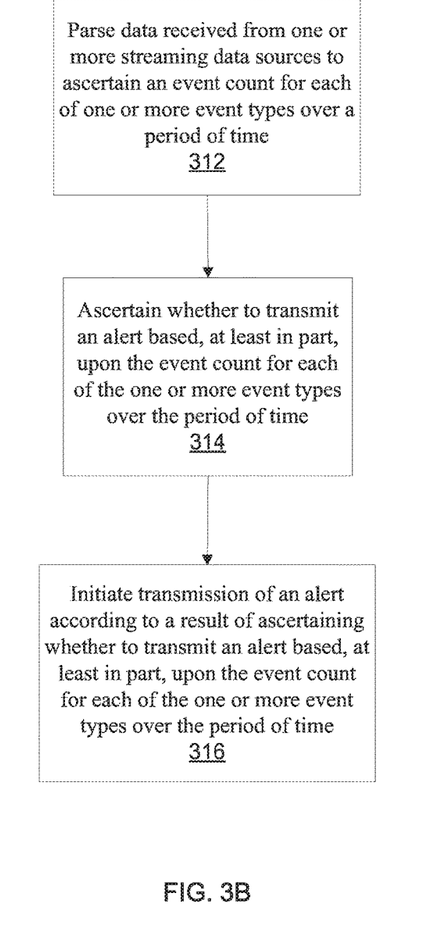
FIG. 3B is a process flow diagram illustrating another example method of performing monitoring of streaming data sources in accordance with various embodiments.

FIG. 3B is a process flow diagram illustrating another example method of performing monitoring of streaming data sources in accordance with various embodiments. One or more devices may parse data received from one or more streaming data sources at 312 to ascertain an event count for each of one or more event types over a period of time. For example, the devices may include multiple Monitoring Devices, as described above with reference to FIG. 2.

It may be ascertained at 314 whether to transmit an alert based, at least in part, upon the event count for each of the one or more event types over the period of time. More particularly, an event count associated with each of one or more events as detected in data received from the one or more streaming data sources may be obtained (e.g., received or retrieved) periodically over a period of time. For example, an Aggregator may receive or retrieve an event count associated with one or more event types from Monitoring Device(s) that have parsed the data.

In accordance with various embodiments, it may be desirable to transmit an alert if the event count for at least one of the event types exceeds a corresponding maximum threshold. In addition, it may be desirable to transmit an alert if the event count for at least one of the event types is less than a corresponding minimum threshold.

In some embodiments, one or more Monitoring Devices may parse data received from one or more streaming data sources to ascertain a subsequent event count for each of the one or more event types over a subsequent period of time. It may be ascertained whether to transmit an alert based, at least in part, upon both the event count for each of the one or more event types over the period of time and the subsequent event count for each of the one or more event types over the subsequent period of time. In this manner, a rate of change of the event count for each of the one or more event types may be ascertained as described above with reference to FIG. 3A.

Transmission of an alert may be initiated at 316 according to a result of ascertaining whether to transmit an alert based, at least in part, upon the event count for each of the one or more event types over the period of time. In some embodiments, transmission of an alert may be initiated according to a result of ascertaining whether to transmit an alert based, at least in part, upon both the event count for each of the one or more event types over the period of time and the subsequent event count for each of the one or more event types over the subsequent period of time.

The transmission of an alert may be initiated by the Aggregator or a separate Notification Module. For example, the Aggregator may communicate with the Notification Module via an API to initiate the transmission of an alert to the appropriate entities. For example, the API may include parameters indicating an event type (e.g., page views or clicks), rate of change or other indicator that a threshold has been exceeded, and/or an identity of one or more entities to be notified.

In accordance with various embodiments, an alert may be transmitted to one or more entities associated with one or more products or processes that are configured to process, receive, or otherwise obtain data transmitted by streaming data sources. For example, such an alert may be transmitted to one or more entities associated with a batch system configured to process the data. Such entities may include one or more individuals or groups of individuals. Alternatively, such entities may include a software and/or hardware module configured to perform an automated suspension or shutdown of a process or product.

An alert may be transmitted via various mechanisms. Moreover, an alert may be configurable according to the particular product and/or personal preferences. In some embodiments, an alert may be transmitted via an electronic mail message or text message.

Upon receipt of an alert by an entity associated with a product or process, such product or process may be suspended by the entity. For example, processing by a batch system that processes the data may be suspended. Such suspension may be for a particular period of time or until receipt of a notice to re-initiate processing by the product or process.

Suspension of processing by a particular product or process configured to process data transmitted by streaming data sources may be performed automatically in response to the receipt of an alert. Alternatively, such suspension may be initiated manually or via a graphical user interface by an individual in response to receipt of an alert.

The disclosed embodiments support the monitoring of event counts and rates of change over short time intervals. In this manner, data anomalies in data over time may be identified. By alerting entities of such anomalies, the downtime of downstream systems configured to process the data may be minimized or avoided. As a result, the integrity of data produced by the downstream systems may be improved. In addition, data reprocessing may be reduced or eliminated, thereby reducing the costs associated with data reprocessing or accommodating data anomalies. Accordingly, the negative consequences of data anomalies introduced by streaming data sources may be reduced or eliminated.

Network

A network may couple devices so that communications may be exchanged, such as between a server and a client device or other types of devices, including between wireless devices coupled via a wireless network, for example. A network may also include mass storage, such as network attached storage (NAS), a storage area network (SAN), or other forms of computer or machine readable media, for example. A network may include the Internet, one or more local area networks (LANs), one or more wide area networks (WANs), wire-line type connections, wireless type connections, or any combination thereof. Likewise, sub-networks, such as may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs.

A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. Furthermore, a computing device or other related electronic devices may be remotely coupled to a network, such as via a telephone line or link, for example.

Content Distribution Network

A distributed system may include a content distribution network. A "content delivery network" or "content distribution network" (CDN) generally refers to a distributed content delivery system that comprises a collection of computers or computing devices linked by a network or networks. A CDN may employ software, systems, protocols or techniques to facilitate various services, such as storage, caching, communication of content, or streaming media or applications. Services may also make use of ancillary technologies including, but not limited to, "cloud computing," distributed storage, DNS request handling, provisioning, signal monitoring and reporting, content targeting, personalization, or business intelligence. A CDN may also enable an entity to operate or manage another's site infrastructure, in whole or in part.

Peer-to-Peer Network

A peer-to-peer (or P2P) network may employ computing power or bandwidth of network participants in contrast with a network that may employ dedicated devices, such as dedicated servers, for example; however, some networks may employ both as well as other approaches. A P2P network may typically be used for coupling nodes via an ad hoc arrangement or configuration. A peer-to-peer network may employ some nodes capable of operating as both a "client" and a "server."

Wireless Network

A wireless network may couple client devices with a network. A wireless network may employ stand-alone ad-hoc networks, mesh networks, Wireless LAN (WLAN) networks, cellular networks, or the like.

A wireless network may further include a system of terminals, gateways, routers, or the like coupled by wireless radio links, or the like, which may move freely, randomly or organize themselves arbitrarily, such that network topology may change, at times even rapidly. A wireless network may further employ a plurality of network access technologies, including Long Term Evolution (LTE), WLAN, Wireless Router (WR) mesh, or 2nd, 3rd, or 4th generation (2G, 3G, or 4G) cellular technology, or the like. Network access technologies may enable wide area coverage for devices, such as client devices with varying degrees of mobility, for example.

For example, a network may enable RF or wireless type communication via one or more network access technologies, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, or the like. A wireless network may include virtually any type of wireless communication mechanism by which signals may be communicated between devices, such as a client device or a computing device, between or within a network, or the like.

Internet Protocol

Signal packets communicated via a network, such as a network of participating digital communication networks, may be compatible with or compliant with one or more protocols. Signaling formats or protocols employed may include, for example, TCP/IP, UDP, DECnet, NetBEUI, IPX, Appletalk, or the like. Versions of the Internet Protocol (IP) may include IPv4 or IPv6.

The Internet refers to a decentralized global network of networks. The Internet includes LANs, WANs, wireless networks, or long haul public networks that, for example, allow signal packets to be communicated between LANs. Signal packets may be communicated between nodes of a network, such as, for example, to one or more sites employing a local network address. A signal packet may, for example, be communicated over the Internet from a user site via an access node coupled to the Internet. Likewise, a signal packet may be forwarded via network nodes to a target site coupled to the network via a network access node, for example. A signal packet communicated via the Internet may, for example, be routed via a path of gateways, servers, etc. that may route the signal packet in accordance with a target address and availability of a network path to the target address.

Social Network

The term "social network" refers generally to a network of individuals, such as acquaintances, friends, family, colleagues, or co-workers, coupled via a communications network or via a variety of sub-networks. Potentially, additional relationships may subsequently be formed as a result of social interaction via the communications network or sub-networks. A social network may be employed, for example, to identify additional connections for a variety of activities, including, but not limited to, dating, job networking, receiving or providing service referrals, content sharing, creating new associations, maintaining existing associations, identifying potential activity partners, performing or supporting commercial transactions, or the like.

A social network may include individuals with similar experiences, opinions, education levels or backgrounds. Subgroups may exist or be created according to user profiles of individuals, for example, in which a subgroup member may belong to multiple subgroups. An individual may also have multiple "1:few" associations within a social network, such as for family, college classmates, or co-workers.

An individual's social network may refer to a set of direct personal relationships or a set of indirect personal relationships. A direct personal relationship refers to a relationship for an individual in which communications may be individual to individual, such as with family members, friends, colleagues, co-workers, or the like. An indirect personal relationship refers to a relationship that may be available to an individual with another individual although no form of individual to individual communication may have taken place, such as a friend of a friend, or the like. Different privileges or permissions may be associated with relationships in a social network. A social network also may generate relationships or connections with entities other than a person, such as companies, brands, or so called 'virtual persons.' An individual's social network may be represented in a variety of forms, such as visually, electronically or functionally. For example, a "social graph" or "socio-gram" may represent an entity in a social network as a node and a relationship as an edge or a link.

Multi-Modal Communication (MMC)

Individuals within one or more social networks may interact or communicate with other members of a social network via a variety of devices. Multi-modal communication technologies refers to a set of technologies that permit interoperable communication across multiple devices or platforms, such as cellphones, smart phones, tablet computing devices, personal computers, televisions, SMS/MMS, email, instant messenger clients, forums, social networking sites (such as Facebook, Twitter, or Google), or the like.

Network Architecture

Figure 4:
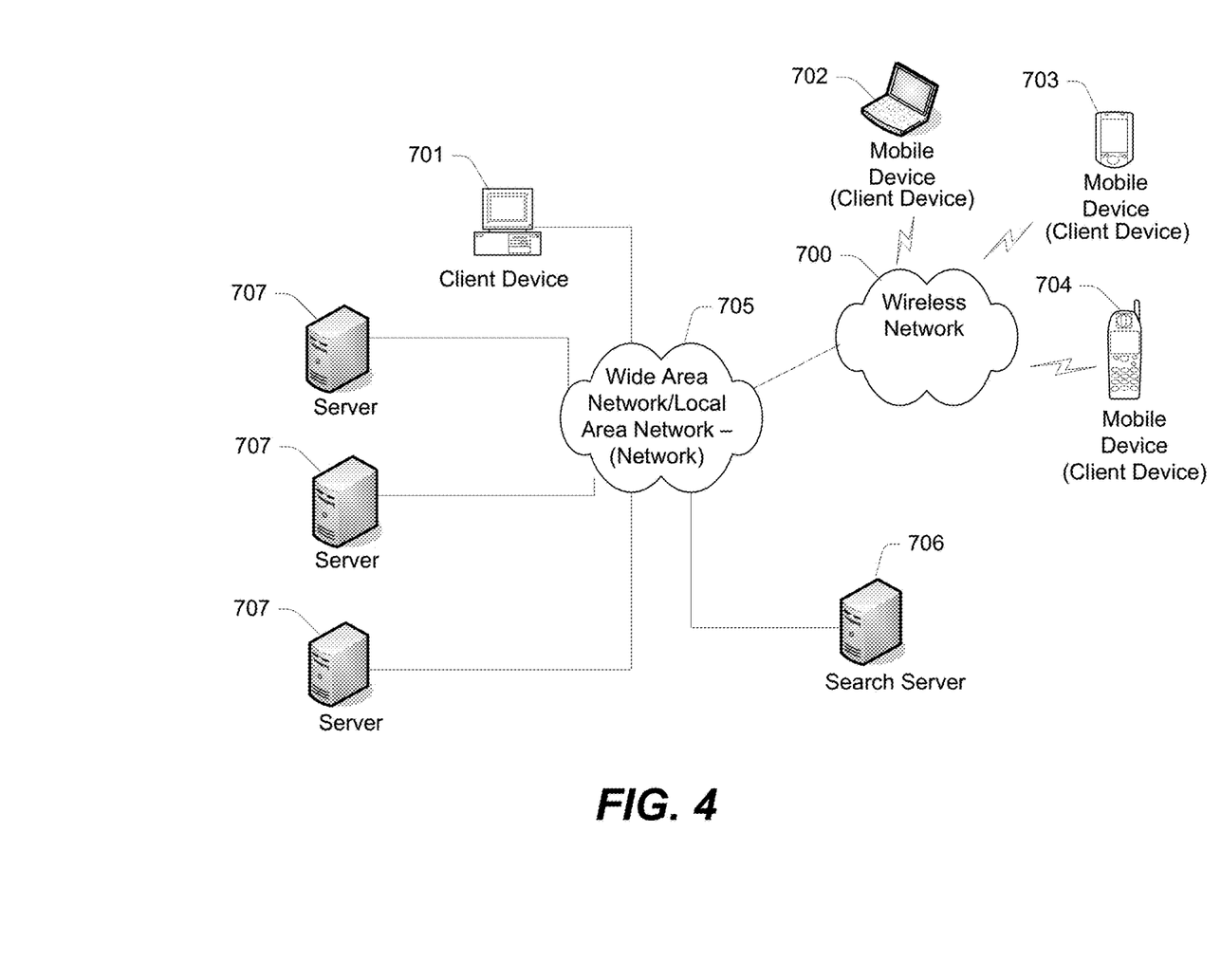
FIG. 4 is a schematic diagram illustrating another example embodiment of a network in which various embodiments may be implemented.

The disclosed embodiments may be implemented in any of a wide variety of computing contexts. FIG. 4 is a schematic diagram illustrating an example embodiment of a network. Other embodiments that may vary, for example, in terms of arrangement or in terms of type of components, are also intended to be included within claimed subject matter. Implementations are contemplated in which users interact with a diverse network environment. As shown, FIG. 4, for example, includes a variety of networks, such as a LAN/WAN 705 and wireless network 700, a variety of devices, such as client devices 701-704, and a variety of servers such as content server(s) 707 and search server 706. The servers may also include an ad server (not shown). As shown in this example, the client devices 701-704 may include one or more mobile devices 702, 703, 704. Client device(s) 701-704 may be implemented, for example, via any type of computer (e.g., desktop, laptop, tablet, etc.), media computing platforms (e.g., cable and satellite set top boxes), handheld computing devices (e.g., PDAs), cell phones, or any other type of computing or communication platform.

The disclosed embodiments may be implemented in some centralized manner. This is represented in FIG. 4 by server(s) 707, which may correspond to multiple distributed devices and data store(s). The server(s) 707 and/or corresponding data store(s) may store user account data, user information, and/or content.

Server

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like.

Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

Content Server

A content server may comprise a device that includes a configuration to provide content via a network to another device. A content server may, for example, host a site, such as a social networking site, examples of which may include, without limitation, Flicker, Twitter, Facebook, LinkedIn, or a personal user site (such as a blog, vlog, online dating site, etc.). A content server may also host a variety of other sites, including, but not limited to business sites, educational sites, dictionary sites, encyclopedia sites, wikis, financial sites, government sites, etc.

A content server may further provide a variety of services that include, but are not limited to, web services, third-party services, audio services, video services, email services, instant messaging (IM) services, SMS services, MMS services, FTP services, voice over IP (VOIP) services, calendaring services, photo services, or the like. Examples of content may include text, images, audio, video, or the like, which may be processed in the form of physical signals, such as electrical signals, for example, or may be stored in memory, as physical states, for example. Examples of devices that may operate as a content server include desktop computers, multiprocessor systems, microprocessor-type or programmable consumer electronics, etc.

Client Device

Figure 5:
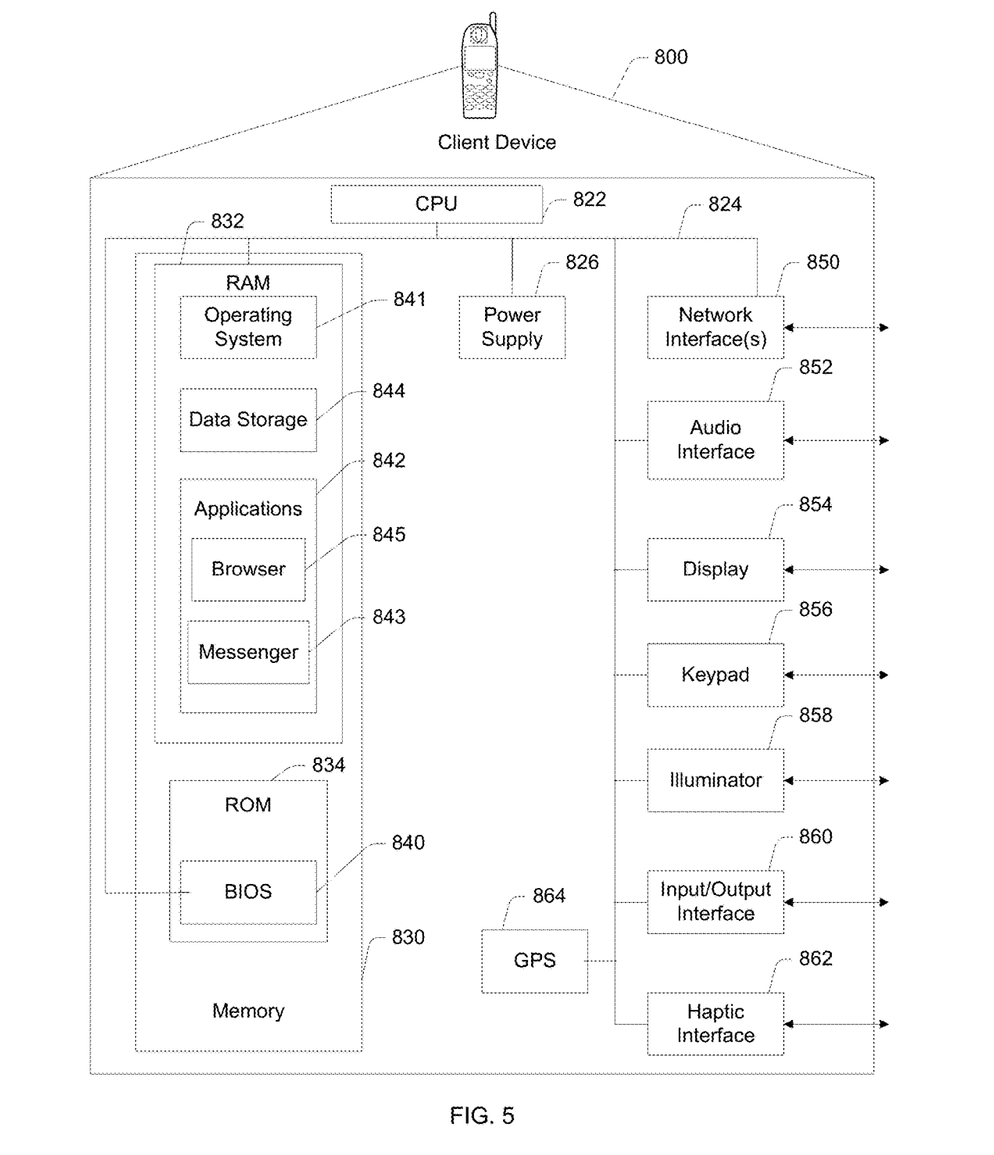
FIG. 5 is a schematic diagram illustrating an example client device in which various embodiments may be implemented.

FIG. 5 is a schematic diagram illustrating an example embodiment of a client device in which various embodiments may be implemented. A client device may include a computing device capable of sending or receiving signals, such as via a wired or a wireless network. A client device may, for example, include a desktop computer or a portable device, such as a cellular telephone, a smart phone, a display pager, a radio frequency (RF) device, an infrared (IR) device, a Personal Digital Assistant (PDA), a handheld computer, a tablet computer, a laptop computer, a set top box, a wearable computer, an integrated device combining various features, such as features of the forgoing devices, or the like. A portable device may also be referred to as a mobile device or handheld device.

As shown in this example, a client device 800 may include one or more central processing units (CPUs) 822, which may be coupled via connection 824 to a power supply 826 and a memory 830. The memory 830 may include random access memory (RAM) 832 and read only memory (ROM) 834. The ROM 834 may include a basic input/output system (BIOS) 840.

The RAM 832 may include an operating system 841. More particularly, a client device may include or may execute a variety of operating systems, including a personal computer operating system, such as a Windows, iOS or Linux, or a mobile operating system, such as iOS, Android, or Windows Mobile, or the like. The client device 800 may also include or may execute a variety of possible applications 842 (shown in RAM 832), such as a client software application such as messenger 843, enabling communication with other devices, such as communicating one or more messages, such as via email, short message service (SMS), or multimedia message service (MMS), including via a network, such as a social network, including, for example, Facebook, LinkedIn, Twitter, Flickr, or Google, to provide only a few possible examples. The client device 800 may also include or execute an application to communicate content, such as, for example, textual content, multimedia content, or the like, which may be stored in data storage 844. A client device may also include or execute an application such as a browser 845 to perform a variety of possible tasks, such as browsing, searching, playing various forms of content, including locally stored or streamed video, or games (such as fantasy sports leagues).

The client device 800 may send or receive signals via one or more interface(s). As shown in this example, the client device 800 may include one or more network interfaces 850. The client device 800 may include an audio interface 852. In addition, the client device 800 may include a display 854 and an illuminator 858. The client device 800 may further include an Input/Output interface 860, as well as a Haptic Interface 862 supporting tactile feedback technology.

The client device 800 may transmit and detect patterns, images, or signals such as infra-red signals via the interface(s). For example, the client device 800 may transmit an infra-red blink pattern, as well as detect an infra-red blink pattern, as described herein.

The client device 800 may vary in terms of capabilities or features. Claimed subject matter is intended to cover a wide range of potential variations. For example, a cell phone may include a keypad 856 such as a numeric keypad or a display of limited functionality, such as a monochrome liquid crystal display (LCD) for displaying text. In contrast, however, as another example, a web-enabled client device may include one or more physical or virtual keyboards, mass storage, one or more accelerometers, one or more gyroscopes, global positioning system (GPS) 864 or other location identifying type capability, or a display with a high degree of functionality, such as a touch-sensitive color 2D or 3D display, for example. The foregoing is provided to illustrate that claimed subject matter is intended to include a wide range of possible features or capabilities.

According to various embodiments, input may be obtained using a wide variety of techniques. For example, input for downloading or launching an application may be obtained via a graphical user interface from a user's interaction with a local application such as a mobile application on a mobile device, web site or web-based application or service and may be accomplished using any of a variety of well-known mechanisms for obtaining information from a user. However, it should be understood that such methods of obtaining input from a user are merely examples and that input may be obtained in many other ways.

Figure 6:
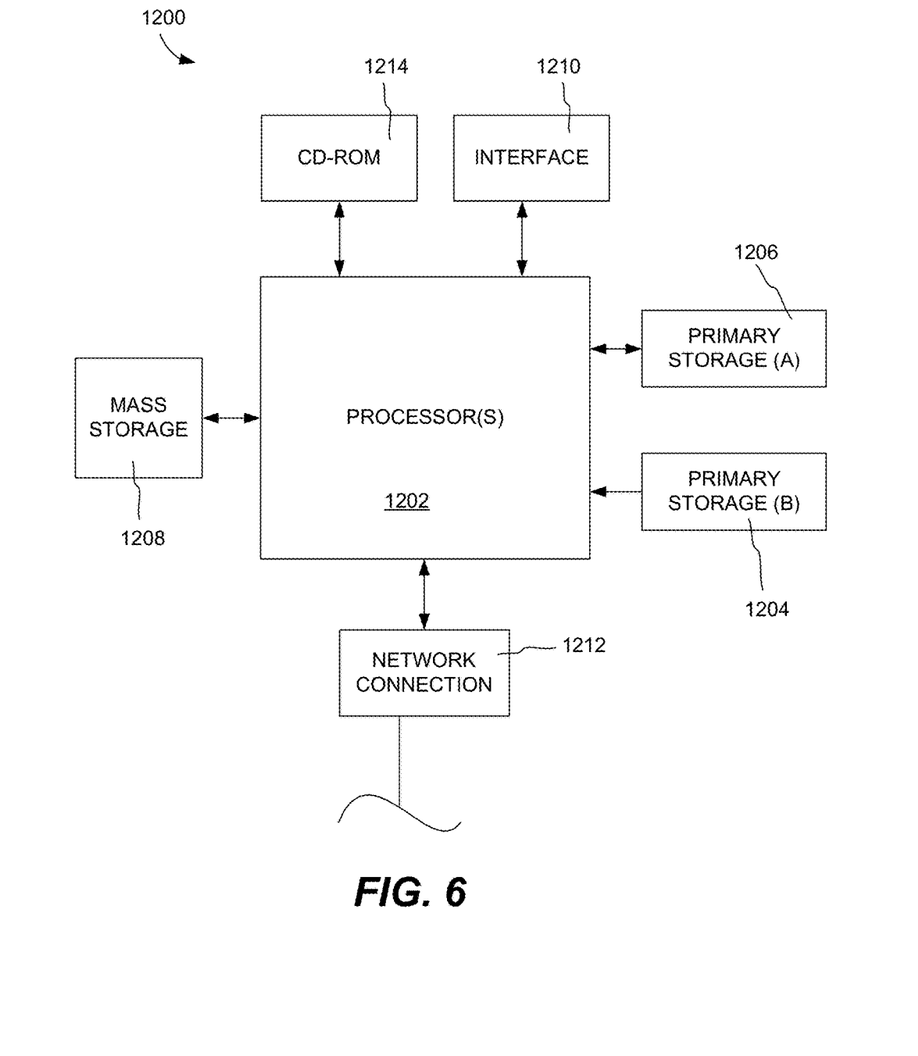
FIG. 6 is a schematic diagram illustrating an example computer system in which various embodiments may be implemented.

FIG. 6 illustrates a typical computer system that, when appropriately configured or designed, can serve as a system via which various embodiments may be implemented. The computer system 1200 includes any number of CPUs 1202 that are coupled to storage devices including primary storage 1206 (typically a RAM), primary storage 1204 (typically a ROM). CPU 1202 may be of various types including microcontrollers and microprocessors such as programmable devices (e.g., CPLDs and FPGAs) and unprogrammable devices such as gate array ASICs or general purpose microprocessors. As is well known in the art, primary storage 1204 acts to transfer data and instructions uni-directionally to the CPU and primary storage 1206 is used typically to transfer data and instructions in a bi-directional manner. Both of these primary storage devices may include any suitable computer-readable media such as those described above. A mass storage device 1208 is also coupled bi-directionally to CPU 1202 and provides additional data storage capacity and may include any of the computer-readable media described above. Mass storage device 1208 may be used to store programs, data and the like and is typically a secondary storage medium such as a hard disk. It will be appreciated that the information retained within the mass storage device 1208, may, in appropriate cases, be incorporated in standard fashion as part of primary storage 1206 as virtual memory. A specific mass storage device such as a CD-ROM 1214 may also pass data uni-directionally to the CPU.

CPU 1202 may also be coupled to an interface 1210 that connects to one or more input/output devices such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 1202 optionally may be coupled to an external device such as a database or a computer or telecommunications network using an external connection as shown generally at 1212. With such a connection, it is contemplated that the CPU might receive information from the network, or might output information to the network in the course of performing the method steps described herein.

Regardless of the system's configuration, it may employ one or more memories or memory modules configured to store data, program instructions for the general-purpose processing operations and/or the inventive techniques described herein. The program instructions may control the operation of an operating system and/or one or more applications, for example. The memory or memories may also be configured to store instructions for performing the disclosed methods, graphical user interfaces to be displayed in association with the disclosed methods, etc.

Because such information and program instructions may be employed to implement the systems/methods described herein, the disclosed embodiments relate to machine readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as optical disks; and hardware devices that are specially configured to store and perform program instructions, such as ROM and RAM. Examples of program instructions include both machine code, such as produced by a compiler, and files containing higher level code that may be executed by the computer using an interpreter.

Computer program instructions with which various embodiments are implemented may be stored in any type of computer-readable media, and may be executed according to a variety of computing models including a client/server model, a peer-to-peer model, on a stand-alone computing device, or according to a distributed computing model in which various of the functionalities described herein may be effected or employed at different locations.

The disclosed techniques may be implemented in any suitable combination of software and/or hardware system, such as a web-based server or desktop computer system. Moreover, a system implementing various embodiments may be a portable device, such as a laptop or cell phone. An apparatus and/or web browser may be specially constructed for the required purposes, or it may be a general-purpose computer selectively activated or reconfigured by a computer program and/or data structure stored in the computer. The processes presented herein are not inherently related to any particular computer or other apparatus. In particular, various general-purpose machines may be used with programs written in accordance with the teachings herein, or it may be more convenient to construct a more specialized apparatus to perform the disclosed method steps.

Although the foregoing embodiments have been described in some detail for purposes of clarity of understanding, it will be apparent that certain changes and modifications may be practiced within the scope of the appended claims. Therefore, the present embodiments are to be considered as illustrative and not restrictive, and are not to be limited to the details given herein, but may be modified within the scope and equivalents of the appended claims.

What is claimed is:

1. A method, comprising:
monitoring, by one or more servers, data received by the one or more servers from one or more streaming data sources;
ascertaining, by the one or more servers, a rate of change in flow of the data received by the one or more servers from the one or more streaming data sources via a network over a period of time;
determining, by the one or more servers, whether the rate of change in the flow of the data received by the one or more servers from the one or more streaming data sources exceeds a threshold rate;
initiating, by the one or more servers, transmission of an alert to one or more entities associated with a downstream system according to a result of determining whether the rate of change in the flow of the data received by the one or more servers from the one or more streaming data sources exceeds the threshold rate;
suspending, by the one or more servers, processing by the downstream system of the data received by the downstream system from the one or more streaming data sources in response to the alert; and
after suspending the processing by the downstream system of the data received by the downstream system from the one or more streaming data sources, re-initiating, by the one or more servers, the processing by the downstream system of the data received by the downstream system from the one or more streaming data sources.

2. The method as recited in claim 1, wherein monitoring the data received from the one or more streaming data sources comprises:
intercepting the data from the one or more streaming data sources over a period of time; and parsing the data received from the one or more streaming data sources over the period of time to ascertain an event count for one or more event types.

3. The method as recited in claim 1, wherein ascertaining a rate of change in flow of the data received from the one or more streaming data sources comprises:

ascertaining a rate of change in an event count for each of one or more event types over a period of time, the rate of change in the flow of data including the rate of change in the event count.

4. The method as recited in claim 3, wherein the event count indicates at least one of a number of page views that have been detected over a period of time or a number of clicks that have been detected over the period of time, and wherein the rate of change in the event count indicates at least one of: 1) a rate of change in the number of page views that have been detected over the period of time or 2) a rate of change in the number of clicks that have been detected over the period of time.

5. The method as recited in claim 1, wherein determining whether the rate of flow of the data received from the one or more streaming data sources exceeds a threshold rate comprises:

periodically obtaining by an aggregator, from the one or more servers, an event count indicating a number of events of an event type detected in the data received from the one or more streaming data sources; and ascertaining by the aggregator a rate of change in the event count indicating the number of events of the event type.

6. The method as recited in claim 1, wherein the downstream system comprises a batch system configured to process the data.

7. The method as recited in claim 1, wherein the one or more streaming data sources includes a plurality of streaming data sources.

8. The method as recited in claim 1, wherein suspending the processing of the data received from the one or more streaming data sources comprises:

suspending the processing of the data for a particular period of time.

9. The method as recited in claim 1, wherein re-initiating the processing of the data received from the one or more streaming data sources comprises:

transmitting, by the one or more servers to the downstream system, a notice to re-initiate the processing of the data.

10. A system, comprising:
one or more servers configured to:
monitor data received from one or more streaming data sources via a network over a period of time;
ascertain a rate of change in flow of the data received by the one or more servers from the one or more streaming data sources;
determine whether the rate of change in the flow of the data received from the one or more streaming data sources exceeds a threshold rate;
initiate transmission of an alert to one or more entities associated with a downstream system according to a result of determining whether the rate of change in the flow of the data received from the one or more streaming data sources exceeds the threshold rate;
suspend processing by the downstream system of the data received by the downstream system from the one or more streaming data sources in response to the alert; and after suspending the processing by the downstream system of the data received by the downstream system from the one or more streaming data sources, re-initiate the processing by the downstream system of the data received by the downstream system from the one or more streaming data sources.

11. The system as recited in claim 10, the one or more servers being further configured to:

transmit the alert to one or more entities associated with the downstream system.

12. The system recited in claim 11, wherein the downstream system comprises a batch system configured to process the data.

13. The system as recited in claim 10, wherein the one or more servers are configured to intercept the data transmitted by the one or more streaming data sources over a period of time and parse the data received from the one or more streaming data sources over the period of time to ascertain an event count for an event type.

14. The system as recited in claim 10, the one or more servers being further configured to periodically obtain an event count of events of an event type detected in the data received from the one or more streaming data sources and to ascertain a rate of change in the event count of the event type, the rate of change in the flow of the data including the rate of change in the event count of the event type.

15. The system as recited in claim 14, wherein the event count indicates a number of page views that have been detected over a period of time or a number of clicks that have been detected over the period of time.

16. A system, comprising:
one or more servers configured to:
parse data received from one or more streaming data sources to ascertain a rate of change in an event count for each of one or more event types over a period of time;
ascertain whether to transmit an alert based, at least in part, upon the rate of change in the event count for each of the one or more event types over the period of time; and
initiate transmission of an alert to one or more entities associated with a downstream system according to a result of ascertaining whether to transmit an alert based, at least in part, upon the rate of change in the event count for each of the one or more event types over the period of time;
suspend processing by the downstream system of the data received by the downstream system from the one or more streaming data sources in response to the alert; and
after suspending the processing by the downstream system of the data received by the downstream system from the one or more streaming data sources, re-initiate the processing by the downstream system of the data received by the downstream system from the one or more streaming data sources.

17. The system as recited in claim 16, wherein ascertaining whether to transmit an alert based, at least in part, upon the rate of change in the event count for each of the one or more event types over the period of time comprises:

ascertaining whether the rate of change in the event count for at least one of the event types exceeds a maximum threshold.

18. The system as recited in claim 16, wherein ascertaining whether to transmit an alert based, at least in part, upon the rate of change in the event count for each of the one or more event types over the period of time comprises:

ascertaining whether the rate of change in the event count for at least one of the event types is less than a minimum threshold.

19. The system as recited in claim 16, wherein the downstream system comprises a batch processing system configured to obtain and process the data streamed by the one or more streaming data sources.

20. The system as recited in claim 16, wherein the event count for one of the event types indicates a number of page views that have been detected over a period of time or a number of clicks that have been detected over the period of time.

21. A system, comprising:
   one or more servers configured to:
      monitor data received from one or more streaming data sources via a network;
ascertain a rate of change in flow of the data received from the one or more streaming data sources;
determine whether the rate of change in the flow of the data received from the one or more streaming data sources exceeds a threshold rate;
initiate transmission of an alert to one or more entities associated with a downstream system according to a result of determining whether the rate of change in the flow of the data received from the one or more streaming data sources exceeds the threshold rate;
suspend processing by the downstream system of the data received by the downstream system from the one or more streaming data sources in response to the alert; and
after suspending the processing by the downstream system of the data received by the downstream system from the one or more streaming data sources, re-initiate the processing by the downstream system of the data received by the downstream system from the one or more streaming data sources.

* * * * *